(12) United States Patent
Miyata

(10) Patent No.: US 7,226,074 B2
(45) Date of Patent: Jun. 5, 2007

(54) AIRBAG APPARATUS, MOTORCYCLE WITH AIRBAG APPARATUS

(75) Inventor: Yasuhito Miyata, Tokyo (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 11/381,501

(22) Filed: May 3, 2006

(65) Prior Publication Data
US 2006/0249937 A1   Nov. 9, 2006

(30) Foreign Application Priority Data
May 9, 2005   (JP)   ............... 2005-136646

(51) Int. Cl.
*B60R 21/16*   (2006.01)
(52) U.S. Cl. .................................. 280/730.1
(58) Field of Classification Search ............ 280/730.1, 280/728.1, 743.2
See application file for complete search history.

(56) References Cited

U.S. PATENT DOCUMENTS 5,938,231 A   8/1999   Yamazaki

FOREIGN PATENT DOCUMENTS

| JP | 2002137777 | 5/2002 |
|---|---|---|
| JP | 2005008055 A * | 1/2005 |

OTHER PUBLICATIONS

Chinn, B.P. et. al. "Development and Testing of a Purpose Built Motorcycle Airbag restrain System," Fifteenth International Technical Conference on the Enhanced Safety of Vehicles, Proceedings Volume, World Congress Centre, Melbourne, Australia, May 13-16, pp. 1167-1188.

* cited by examiner

*Primary Examiner*—Faye M. Fleming
(74) *Attorney, Agent, or Firm*—Fitch, Even, Tabin & Flannery

(57) ABSTRACT

An airbag is provided in which thorough protection of a rider upon vehicle accident is achieved while downsizing the airbag to the minimum size. In one form, an airbag apparatus to be mounted to a motorcycle includes an airbag which is deployed and inflated upon front collision of a vehicle. The airbag is configured to constrain a rider by being deployed and inflated locally in terms of the vertical direction of a vehicle body in a lumbar part area of a rider protecting area formed in front of the rider.

16 Claims, 7 Drawing Sheets

[Fig. 3]

AIRBAG APPARATUS, MOTORCYCLE WITH AIRBAG APPARATUS

FIELD OF THE INVENTION

The present invention relates to a technique for constituting an airbag apparatus to be mounted to a vehicle.

BACKGROUND OF THE INVENTION

In the related art, various techniques for protecting a rider by mounting an airbag apparatus on a vehicle such as a motorcycle or the like are known. For example, in a motorcycle, a technique for deploying and inflating an airbag stored in a housing mounted to a vehicle body frame by inflation gas, thereby constraining a rider in case of front collision is known (for example, see Japanese Unexamined Patent Application Publication No. 2002-137777). In this technique, a possibility to secure a wide protection area by the airbag is proposed. However, it is necessary to increase the size of the airbag correspondingly. Therefore, constitution of an improved technique effective for constraining the rider reliably by the airbag even when the airbag is downsized to the minimum size is highly requested.

SUMMARY OF THE INVENTION

In view of such circumstances, it is an object of the present invention to provide a technique of constituting an airbag which enables thorough protection of a rider in case of vehicle accident while downsizing the airbag to a minimum size, and techniques relating thereto.

In order to achieve the above-described object, the invention described hereinafter is provided. The invention described herein typically can be applied to a structure of an airbag apparatus which is mounted to various types of motorcycles. In this specification, the term "motorcycle" which is a typical example of the vehicle widely includes a saddle-type vehicle, that is, a vehicle of a type in which the rider is seated on a seat in a straddled manner. For example, a motorcycle of a touring type having also a fuel tank in front of the rider's seat and a motorcycle of a scooter type having a space formed between the rider's seat and a head pipe for supporting a handle are both included. In addition to the above-described motorcycles, vehicles having three or more traveling wheels and are configured to allow the rider to be seated in the straddled manner (for example, three-wheeled motorcycles used for pizza delivery or the like, or three- or four-wheeled buggy type motorcycles for rough-terrain traveling), and vehicles traveling with skids or caterpillars and are configured to allow the rider to be seated in the straddled manner like a snowmobile or the like are also included widely in the term "motorcycle".

According to the invention described in one form, an airbag which constitutes an airbag apparatus is deployed and inflated by being supplied with inflation gas therein by an inflation gas supply mechanism such as an inflator or the like in case of front collision of a vehicle.

In particular, according to the airbag apparatus of the present invention, the airbag is locally deployed and inflated in terms of the vertical direction of a vehicle body in a lumbar part area of a rider protecting area formed in front of a rider for constraining the rider. In other words, the airbag of the present invention is not deployed and inflated in the entire rider protecting area, but is deployed and inflated intensively at a local position (local part) of the vehicle body in terms of the vertical direction, that is, the lumbar part area.

The term "lumbar part area" in this specification designates an area near the lumbar part of the rider seated on a seat, and widely includes an area formed in the periphery, front and side of the lumbar part of the rider. Such the lumbar part area corresponds to the local position (local part) in terms of the vertical direction (in the direction of the height of the passenger) of the rider protecting area. Typically, the lumbar part area is defined by the area in the range formed upwardly of the knee portion (or the leg portion) of the rider seated on the seat and downwardly of the chest portion of the rider, and the airbag can be deployed and inflated within the range of the lumbar part area.

After having devoted ourselves to study deployment and inflation modes of an airbag which is effective for constraining a rider, the inventors found that at least the lumbar part area is reliably constrained by the deployed and inflated airbag, thorough protection of the rider is achieved. In other words, since the lumbar part area substantially matches the center of gravity of the rider, the rider can be constrained reliably upon collision of the vehicle by configuring the airbag to be deployed and inflated locally at least in the lumbar part area. Therefore, in the present invention, an airbag apparatus provided with an airbag which is deployed and inflated locally in the lumbar part area as described above is constituted.

In other words, the present invention is based on a rational technical idea such that the airbag is deployed and inflated not in the wide range over the entire rider protecting area, but only locally in the lumbar part area which is important for reliably constraining the rider.

According to the structure as in the invention of the first form, since it is not necessary to make the airbag to be deployed and inflated in the wide range over the entire rider protecting area formed in front of the rider, the airbag and the airbag apparatus for storing the airbag can be downsized. In addition, since constraint the rider can be maintained while downsizing the airbag apparatus, the thorough protection of the rider in case of vehicle accident is achieved.

According to the invention described in a second form, in the structure of the airbag apparatus of the first form, the lumbar part area is defined by an area formed upwardly of the knee portion of the rider and downwardly of the chest portion of the rider. In the present invention, the airbag is configured to be deployed and inflated within the range of the lumbar part area. By making the airbag to be inflated and deployed in the area upwardly of the knee portion of the rider and downwardly of the chest portion of the rider, the rider is effectively prevented from rising upward in case of the front collision of the vehicle. In other words, since the area formed upwardly of the knee portion of the rider and downwardly of the chest portion of the rider substantially corresponds to the center of gravity of the rider, by configuring the airbag to be deployed and inflated locally at least in this area, rising up of the rider upon such as pitching rotation of the vehicle as well as upon the vehicle collision can be reliably prevented.

Therefore, according to the invention of the second form, protection of the rider upon the vehicle accident can be achieved further reliably. In the present invention, slight vertical displacement of the boundary of the lumbar part area formed upwardly of the knee portion of the rider and downwardly of the chest portion of the rider is accepted.

The invention according to a third form is specified as a motorcycle on which the airbag apparatus according to either the first or second forms is mounted.

Therefore, according to the invention of the third form, a motorcycle in which the airbag and the airbag apparatus for storing the airbag are downsized is provided. Also, the motorcycle which can achieve thorough protection of the rider upon the vehicle accident while downsizing the airbag and the airbag apparatus is provided.

As described thus far, according to the present invention, the technique of constituting the airbag in which the thorough protection of the rider upon vehicle accident is achieved while downsizing the airbag to the minimum size and the related technique thereof is achieved by employing the airbag which is deployed and inflated locally in terms of the vertical direction of the vehicle body in the lumbar part area of the rider protecting area formed in front of the rider.

DETAILED DESCRIPTION OF THE PREFERRED EMBODIMENTS

Figure 1:
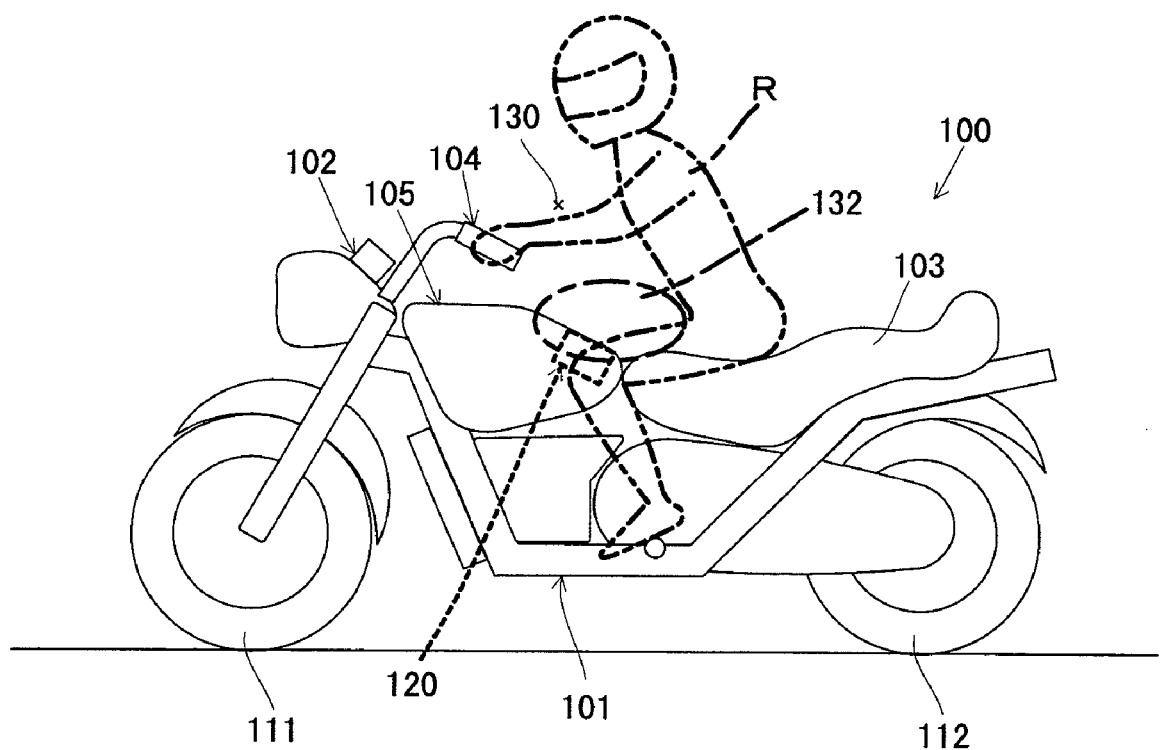
FIG. 1 is a drawing of a motorcycle 100 according to an embodiment of the present invention viewed from the side of a vehicle, showing a state in which an airbag apparatus 120 is mounted to the motorcycle 100.
Figure 2:
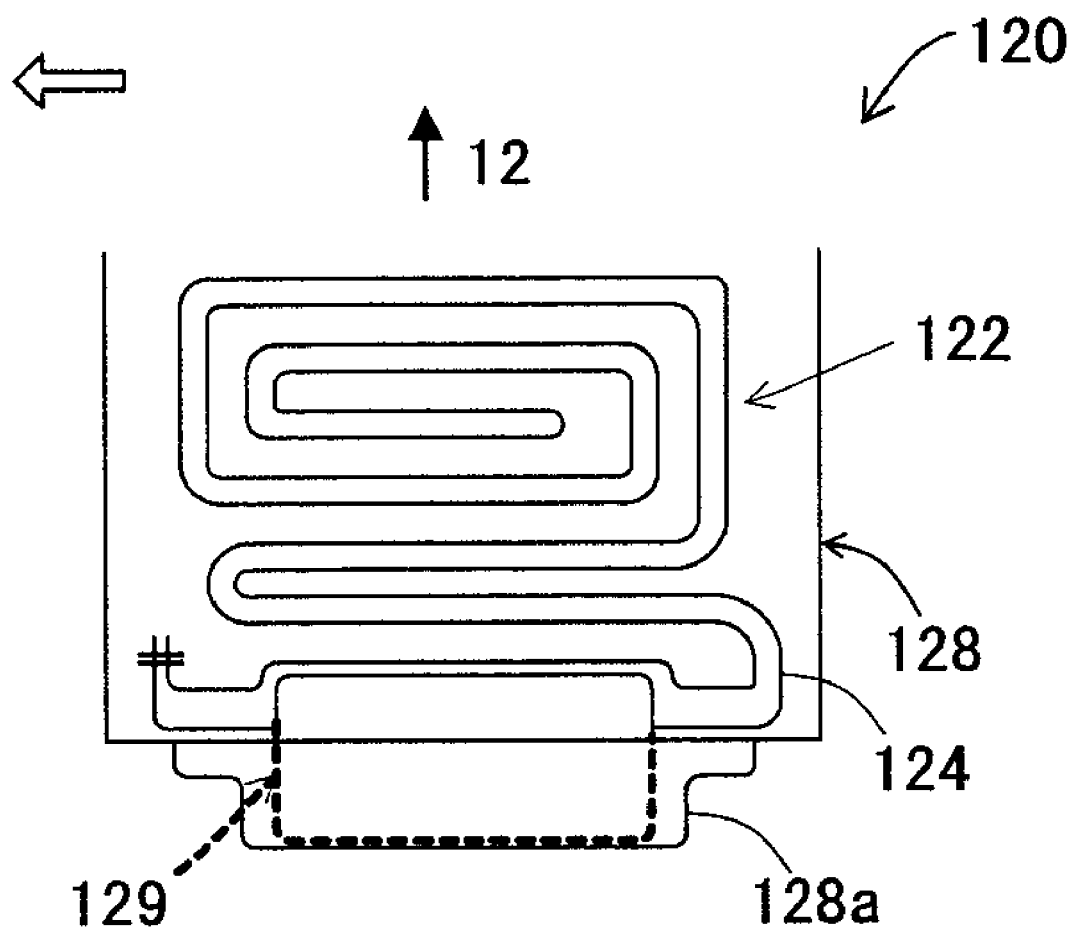
FIG. 2 is a drawing showing a structure of the airbag apparatus 120 in FIG. 1.

Referring now to the drawings, embodiments of the present invention will be described. Referring first to FIG. 1 and FIG. 2, structures of a motorcycle 100 and an airbag apparatus 120 will be described. FIG. 1 is a drawing of the motorcycle 100 according to an embodiment of the present invention viewed from the side, showing a state in which the airbag apparatus 120 is mounted to the motorcycle 100. FIG. 2 is a drawing showing a structure of the airbag apparatus 120 in FIG. 1. The motorcycle 100 in this embodiment corresponds to an example of the "vehicle" or the "motorcycle" in the present invention.

As shown in FIG. 1, the motorcycle 100 is constituted as a motorcycle of a touring type, mainly including a vehicle body structure 101 having an engine, a main frame, and so on, a seat 103 on which a rider R can be seated in a straddled manner, a handle 104, a front wheel 111, and a rear wheel 112 and so on.

An area above the vehicle body structure 101 of the motorcycle 100 in front of the rider R is defined as a rider protecting area 130 in case of front collision of the motorcycle 100. The term "front collision" in this embodiment widely includes a mode in which the motorcycle 100 comes into collision with an object of collision in front thereof (not specifically shown for the sake of convenience). The term "rider protecting area 130" in this embodiment is an area corresponding to the "rider protecting area" in the present invention, and is defined as a space which extends in the direction of forward movement of the rider R when the rider R is moved forwardly of the motorcycle 100 by kinetic energy generated in case of front collision for constraining and protecting the rider R who is apt to be thrown forwardly of the motorcycle 100.

A front portion 102 situated on a front side of a vehicle body of the vehicle body structure 101 is provided with a headlight, various meters, and switches or the like, and the airbag apparatus 120 is provided on a rear portion of a fuel tank 105 arranged rearwardly of the front portion 102. In particular, the airbag apparatus 120 of this embodiment is arranged so as to be exposed to the rider protecting area 130 of the rider R. The airbag apparatus 120 corresponds to the "airbag apparatus" in the present invention. In this embodiment, the airbag apparatus 120 is arranged so that the direction of protrusion (deployment and inflation) of an airbag 122 (described later) which constitutes the airbag apparatus 120 is directed toward a lumbar part area 132 of the rider protecting area 130. The lumbar part area 132 is a local position (local part) in terms of the vertical direction of the vehicle body (the direction of the height of the rider) of the rider protecting area 130, and is located upwardly of the knee portion (or the leg portion) of the rider R seated on the seat 103, which is defined by an area formed downwardly of the chest portion of the rider R. The lumbar part area 132 corresponds to the "lumbar part area" in the present invention.

The airbag apparatus 120 mainly includes, as shown in FIG. 2, a retainer 128 as an airbag storage body, the airbag 122 to be stored in the retainer 128 in a folded state, and an inflator 129 stored in an inflator storage section 128a of the retainer 128 for supplying inflation gas into the airbag 122 so that the airbag 122 is deployed and inflated from the retainer 128. The airbag 122 corresponds to the "airbag" in the present invention. In FIG. 2, the direction of protrusion (deployment) of the airbag 122 is indicated by an arrow 12.

Figure 3:
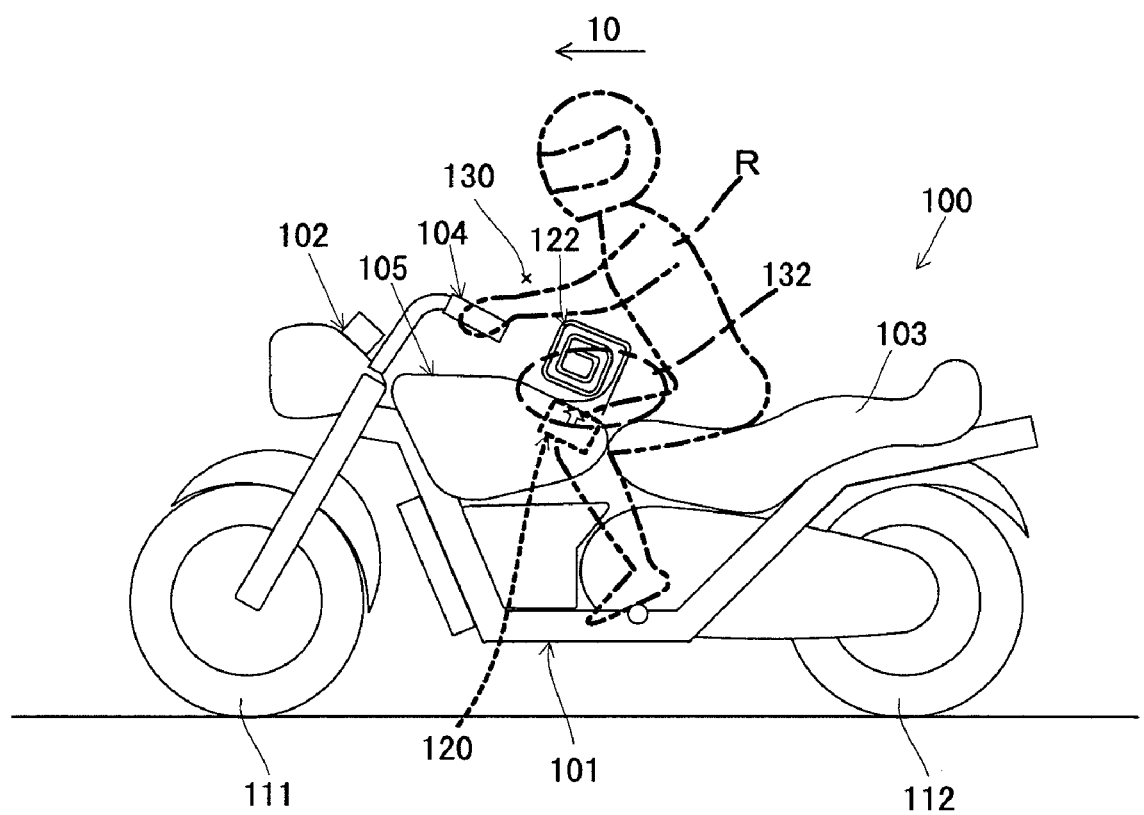
FIG. 3 is a drawing of a state in which deployment and inflation of the airbag 122 are started viewed from the side of the vehicle.
Figure 4:
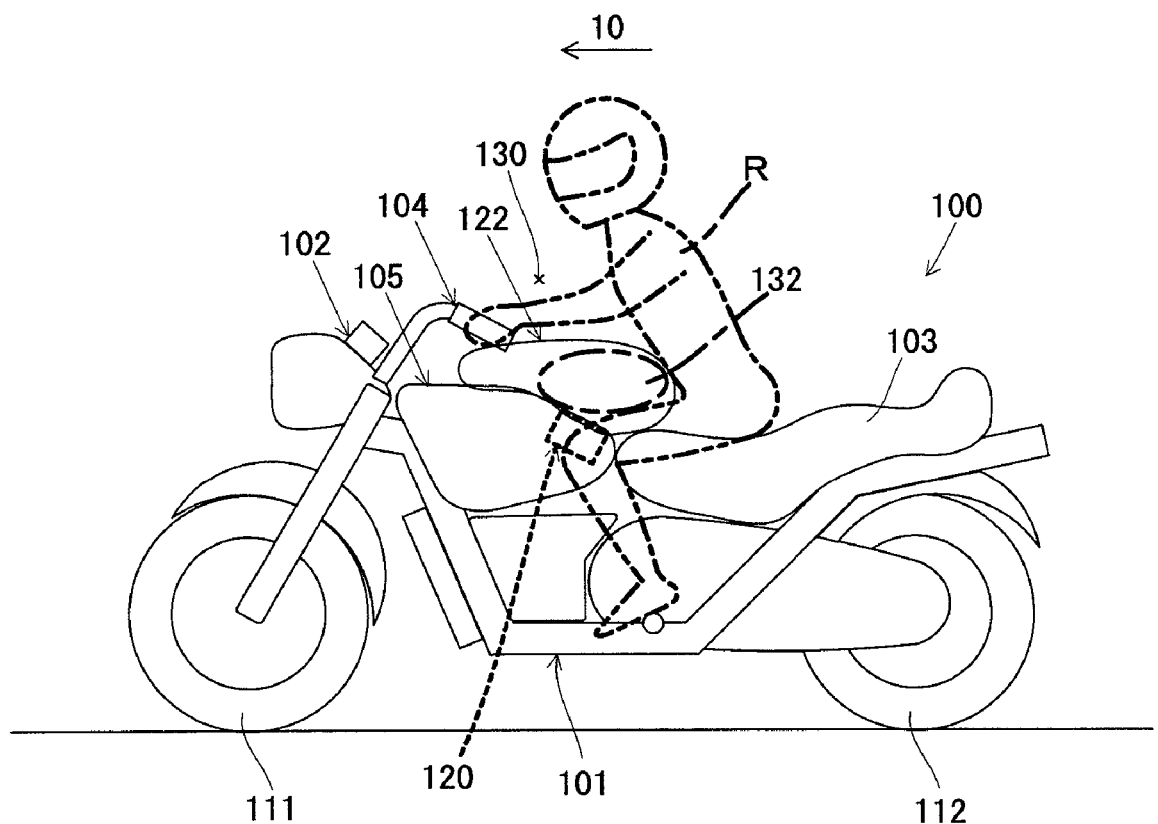
FIG. 4 is a drawing showing a state in which deployment and inflation of the airbag 122 are completed viewed from the side of the vehicle.
Figure 5:
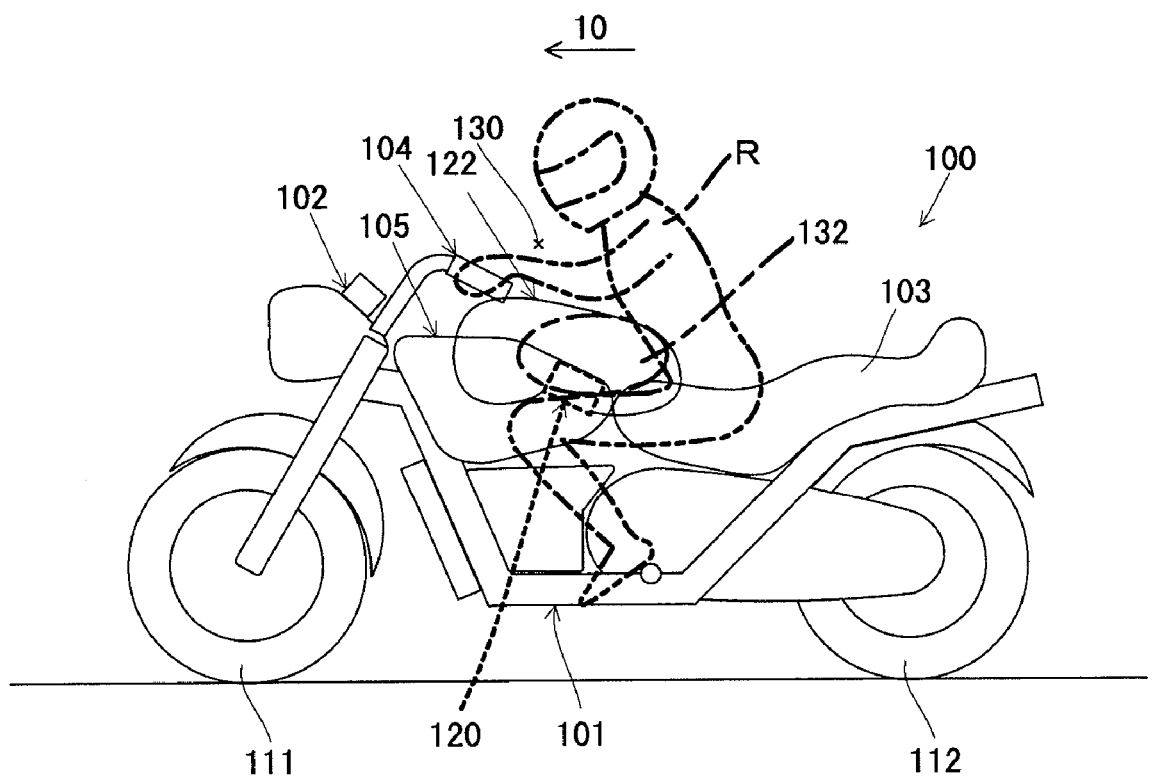
FIG. 5 is a drawing of a state in which a rider R is constrained by the deployed and inflated airbag 122 viewed from the side of the vehicle.
Figure 6:
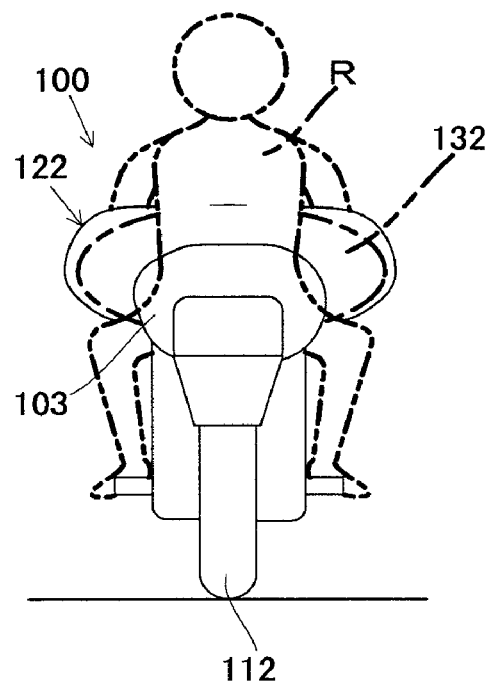
FIG. 6 is a drawing of a state in which the rider R is constrained by the deployed and inflated airbag 122 viewed from the rear of the vehicle.
Figure 7:
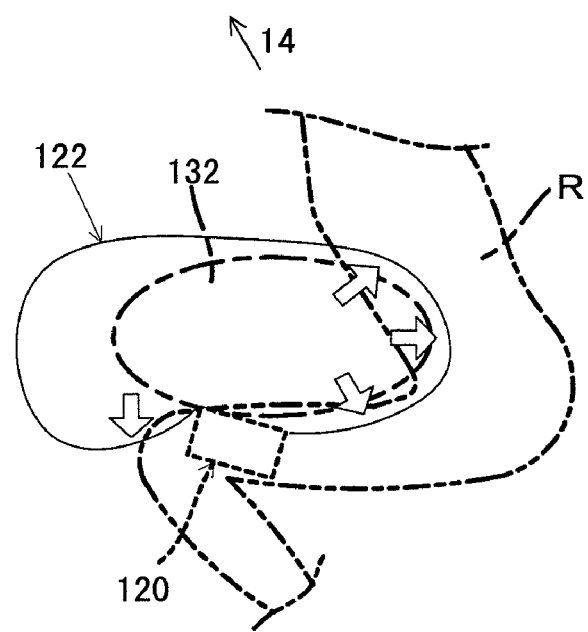
FIG. 7 is a drawing showing a state in which the rider R is constrained by the airbag 122 which is deployed and inflated locally in the lumbar part area 132.
Figure 8:
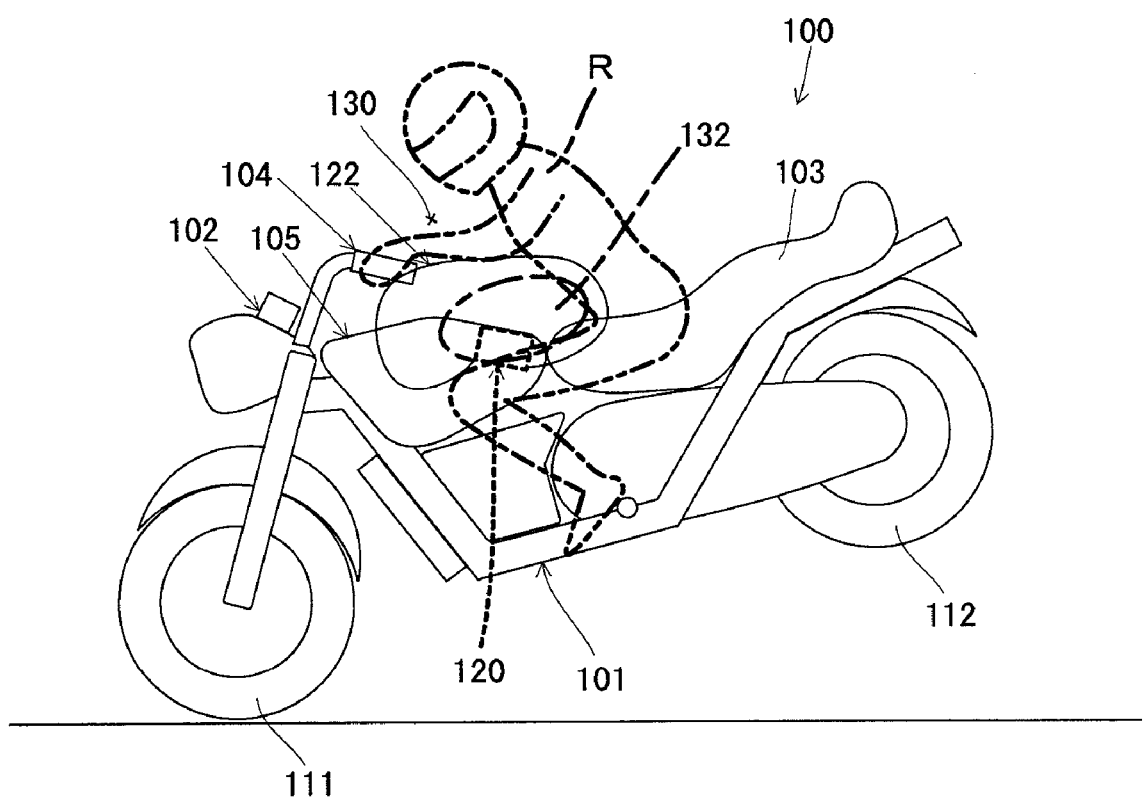
FIG. 8 is a drawing showing a state of rider protection at the time of pitching rotation viewed from the side of the vehicle.

Here, referring now to FIG. 3 to FIG. 8, an operating state of the airbag apparatus 120 having the structure described above will be described. FIG. 3 is a drawing of a state in which deployment and inflation of the airbag 122 are started viewed from the side of the vehicle. FIG. 4 is a drawing showing a state in which deployment and inflation of the airbag 122 are completed viewed from the side of the vehicle. FIG. 5 is a drawing of a state in which the rider R is constrained by the deployed and inflated airbag 122 viewed from the side of the vehicle. FIG. 6 is a drawing of a state in which the rider R is constrained by the deployed and inflated airbag 122 viewed from the rear of the vehicle. FIG. 7 is a drawing showing a state in which the rider R is constrained by the airbag 122 which is deployed and inflated locally in the lumbar part area 132. FIG. 8 is a drawing showing a state of rider protection at the time of pitching rotation viewed from the side of the vehicle.

As shown in FIG. 3, when the motorcycle 100 is encountered with collision in the direction of travel thereof, the rider R is apt to move (to be thrown) toward a front (for example, the direction indicated by an arrow 10 in FIG. 3) of the motorcycle 100. In this embodiment, by a detection of the front collision, the inflator 129 is activated, and the airbag 122 is started to be protruded (deployed) from the airbag apparatus 120 toward the lumbar part area 132 of the rider protecting area 130. Then, inflated portion of the airbag 122 is formed gradually from the retainer 128 side by inflation gas continuously fed into the airbag 122.

In this manner, as shown in FIG. 4, the state in which the airbag 122 is completely deployed and inflated is established. In this state, the inflated airbag 122 is filled locally in the lumbar part area 132. In other words, the airbag 122 in this embodiment is not deployed and inflated in the wide range over the entire rider protecting area 130, but deployed locally (at the local position) and intensively in the lumbar part area 132.

When the motorcycle 100 collides in front and the rider R is apt to move in the direction of the forward movement due to the kinetic energy generated upon collision, as shown in FIG. 5 and FIG. 6, the airbag 122 filled in the lumbar part area 132 is arranged on the direction of movement of the rider R, the periphery of the lumbar part and the leg portion of the rider R who assumes a forwardly inclined posture is constrained effectively from the front, side, and above. In particular, as shown in FIG. 7, by deploying and inflating the airbag 122 at a position above the knee portion (the leg portion) of the rider R, rising-up of the rider R in the direction indicated by an arrow 14 in FIG. 7 in case of the front collision of the vehicle is effectively prevented. In this manner, when the rider R can be reliably constrained at least in the lumbar part area 132 by the deployed and inflated airbag 122, the thorough protection of the rider R can be achieved.

There may be a case in which the motorcycle 100 which is encountered with the front collision is subjected to a pitching rotation due to an energy generated upon collision. In this case, as shown in FIG. 8, the constraint state of the rider R is maintained by the inflated airbag 122. In particular, since the airbag 122 is configured to be deployed and inflated in the lumbar part area 132 situated downwardly of the chest portion of the rider R to press and hold the femoral region of the rider R which is apt to rise upward from above in the direction indicated by the arrow 14 in FIG. 7, the femoral region is caught by the deployed and inflated airbag 122, and hence the rider R is reliably constrained from above upon such as the pitching rotation of the vehicle.

As described above, according to this embodiment, by configuring the airbag 122 to be deployed and inflated locally at least in the lumbar part area 132 in the rider protecting area 130, the rider R can be reliably constrained, whereby the thorough protection of the rider R is achieved. In other words, the lumbar part area 132 formed above the knee portion of the rider R and below the chest portion of the rider R substantially matches the center of gravity of the rider R, and hence by configuring the airbag to be locally deployed and inflated at least in the lumbar part area 132, the rising up of the rider can be reliably prevented even upon such as the pitching rotation of the vehicle as well as upon the vehicle collision.

In this manner, the structure of the airbag apparatus 120 in this embodiment is based on a rational technical idea such that the airbag 122 is deployed and inflated not in the wide range over the entire rider protecting area 130, but only locally in the lumbar part area 132 which is important for reliably constraining the rider R.

In this embodiment, since the airbag 122 is locally deployed and inflated in the lumbar part area 132, it is effective for downsizing the airbag 122 and the retainer 128 or the like for storing the airbag 122 in comparison with the structure in which the airbag 122 is deployed and inflated in the wide range entirely in the rider protecting area 130. For example, it is also conceivable to allow the airbag 122 to be deployed and inflated locally in an area corresponding to the shoulder portion of the rider. However, in this structure, it is necessary to make the airbag to be filled in the wide range, and hence the downsizing of the airbag is limited. In this embodiment, since the airbag 122 is deployed and inflated toward the lumbar part area 132 which is close to the position of installation of the airbag apparatus 120, the airbag 122 and the retainer 128 or the like can further be downsized. Since the constraint of the rider can be maintained while downsizing the airbag 122 and the retainer 128 or the like, the thorough protection of the rider upon vehicle accident is achieved.

The present invention is not limited to the above-described embodiment, and various applications or modifications are conceivable. For example, embodiments shown below in which the above-described embodiment is applied can be implemented.

Although the case in which the airbag 122 deployed and inflated in the lumbar part area 132 constrains the periphery of the lumbar part and the leg portion of the rider R from the front, side, and above has been described in the above-described embodiment, the airbag 122 can be configured to wrap around the lumbar part of the rider R to the rear side.

Although the lumbar part area 132 is defined as the area formed above the knee portion (or the leg portion) of the rider R seated on the seat 103 and below the chest portion of the same, the area can be varied (enlarged or reduced) in the vertical direction as needed.

Although the motorcycle 100 of, so-called, a touring type has been described in the above-described embodiment, the present invention can also be applied to other types of motorcycles such as a scooter type having a space between the handle and the seat, or to vehicles other than the motorcycle 100.

In the above-described embodiments, the case in which the airbag apparatus 120 (retainer 128) is arranged rearwardly of the fuel tank 105 has been described. However, as long as the airbag 122 is configured to be deployed and inflated in the lumbar part area 132 upon collision of the vehicle, the position to arrange the airbag apparatus 120 (retainer 128) can be changed as needed. For example, the airbag apparatus 120 can be arranged at a position forwardly of the position shown in FIG. 1 of the vehicle. In the motorcycle of the scooter type, the airbag apparatus 120 (retainer 128) can be arranged on the vehicle body at the lower portion or the front portion of the seat.

What is claimed is:

1. An airbag apparatus for a motorcycle, the airbag apparatus comprising:
   a retainer mounted to the motorcycle; and
   an airbag for being deployed from the retainer during a front collision of the motorcycle, the deployed airbag being compactly sized so that full inflation thereof occurs proximate the retainer with the fully inflated airbag forwardly of a rider of the motorcycle such that the fully inflated, compactly sized airbag only extends along a lower portion of an upper body portion of the rider, and has a top portion that is approximately level with a chest of the rider's upper body portion and below a head thereof.

2. The airbag apparatus of claim 1 wherein the inflated airbag has a lower portion that is generally disposed above a rider's knee portion to keep the rider from rising upwardly off a seat of the motorcycle during a forward collision therewith.

3. The airbag apparatus of claim 1 wherein the airbag is sized so that the fully inflated airbag has a lower portion thereof generally adjacent to and above a knee portion of the rider.

4. The airbag apparatus of claim 1 wherein the retainer and the airbag are arranged and sized so that the airbag is inflated in an area generally corresponding with a center of gravity of the rider driving the motorcycle on a seat thereof.

5. The airbag apparatus of claim 1 wherein the retainer is mounted forwardly and adjacent to a seat of the motorcycle.

6. The airbag apparatus of claim 5 wherein the inflated airbag has a lower portion that extends forwardly from the retainer along the fuel tank.

7. The airbag apparatus of claim 1 wherein the inflated airbag has a top portion that is generally disposed below a top portion of the handlebars of the motorcycle.

8. A motorcycle comprising:
a body;
a seat of the body for supporting a rider seated thereon;
handle bars of the body extending upwardly forwardly of the seat; and
an airbag for being fully inflated in a compact area between the seat and the handle bars.

9. The motorcycle of claim 8 wherein the handle bars include an uppermost portion, and the fully inflated airbag includes a corresponding uppermost portion that does not extend above the uppermost portion of the handle bars.

10. The motorcycle of claim 8 wherein the airbag includes a retainer from which the airbag is deployed with the retainer being mounted in proximity to the seat or a fuel tank adjacent to the seat.

11. The motorcycle of claim 8 wherein the fully inflated airbag has side portions that extend laterally beyond and down along either side of the body, the seat or a fuel tank.

12. The motorcycle of claim 8 further comprising a fuel tank of the body between the seat and the handlebars, wherein the airbag includes a retainer from which the airbag is deployed with the retainer mounted to the fuel tank so that the fully inflated airbag extends rearwardly from the retainer into engagement with a lower body portion of the rider, forwardly from the retainer along the fuel tank and on either side thereof, and upwardly to a position below an uppermost portion of the handle bars.

13. A motorcycle comprising:
a body;
a seat of the body for supporting a rider seated thereon;
handle bars of the body extending upwardly forwardly of the seat;
a fuel tank of the body between the seat and the handle bars; and
an airbag for being fully inflated in a compact area between the seat and the handle bars and over and on either side of the fuel tank,
wherein the fully inflated airbag has side portions that extend laterally beyond and down along either side of the fuel tank.

14. The motorcycle of claim 13 wherein the handle bars include an uppermost portion, and the fully inflated airbag includes a corresponding uppermost portion that does not extend above the uppermost portion of the handle bars.

15. The motorcycle of claim 13 wherein the airbag includes a retainer from which the airbag is deployed with the retainer being mounted to the fuel tank adjacent to the seat.

16. The motorcycle of claim 13 wherein the airbag includes a retainer from which the airbag is deployed with the retainer mounted to the fuel tank so that the fully inflated airbag extends rearwardly from the retainer into engagement with a lower body portion of the rider, forwardly from the retainer along the fuel tank and on either side thereof, and upwardly to a position below an uppermost portion of the handle bars.

* * * * *